US012647405B2

(12) United States Patent
Shimizu et al.

(10) Patent No.: US 12,647,405 B2
(45) Date of Patent: Jun. 2, 2026

(54) SECURITY APPARATUS, MANAGEMENT APPARATUS, COMMUNICATION SYSTEM, AND SECURITY MANAGEMENT METHOD

(71) Applicant: Sumitomo Electric Industries, Ltd., Osaka (JP)

(72) Inventors: Shota Shimizu, Osaka (JP); Takanori Miyoshi, Osaka (JP); Masato Izawa, Osaka (JP); Isao Kato, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 24 days.

(21) Appl. No.: 18/723,473

(22) PCT Filed: Oct. 6, 2022

(86) PCT No.: PCT/JP2022/037391

§ 371 (c)(1),
(2) Date: Jun. 24, 2024

(87) PCT Pub. No.: WO2023/127222

PCT Pub. Date: Jul. 6, 2023

(65) Prior Publication Data

US 2025/0055837 A1 Feb. 13, 2025

(30) Foreign Application Priority Data

Dec. 27, 2021 (JP) ................................. 2021-212496

(51) Int. Cl.
*H04L 9/40* (2022.01)

(52) U.S. Cl.
CPC .................................... *H04L 63/08* (2013.01)

(58) Field of Classification Search
None
See application file for complete search history.

(56) References Cited

U.S. PATENT DOCUMENTS

2010/0009711 A1* 1/2010 Takada ..................... H04W 4/80
455/525
2011/0321146 A1* 12/2011 Vernon ................... G06F 21/35
726/7

(Continued)

FOREIGN PATENT DOCUMENTS

JP 2009-048574 A 3/2009
JP 2014-092885 A 5/2014

(Continued)

*Primary Examiner* — Raqiul A Choudhury
(74) *Attorney, Agent, or Firm* — XSENSUS LLP

(57) ABSTRACT

This security device comprises: a plurality of communication ports that can be connected to apparatuses; a switch unit that is able to communicate with a plurality of the apparatuses through the plurality of communication ports; and an authentication unit that acquires a connection command for at least any one of the apparatuses among the plurality of apparatuses, the connection command including authentication information, and that authenticates the connection command on the basis of the authentication information. When the authentication is successful, the authentication unit sets a communicable range, which is formed by the switch unit, of the at least any one of the apparatuses through the switch unit, in accordance with the connection command.

20 Claims, 7 Drawing Sheets

(56)  References Cited

U.S. PATENT DOCUMENTS

| | | | |
|---|---|---|---|
| 2015/0123786 A1* | 5/2015 | Hasan | G08B 21/24 |
| | | | 340/539.12 |
| 2019/0357080 A1* | 11/2019 | Shanbhag | H04W 12/088 |
| 2020/0389436 A1 | 12/2020 | Go et al. | |
| 2022/0166727 A1* | 5/2022 | Waldman | H04L 49/30 |
| 2022/0174587 A1* | 6/2022 | Soryal | H04W 48/18 |
| 2023/0046939 A1 | 2/2023 | Miyoshi et al. | |

FOREIGN PATENT DOCUMENTS

| | | | |
|---|---|---|---|
| WO | 2020/095520 A1 | 5/2020 | |
| WO | 2021/166321 A1 | 8/2021 | |

* cited by examiner

SECURITY APPARATUS, MANAGEMENT APPARATUS, COMMUNICATION SYSTEM, AND SECURITY MANAGEMENT METHOD

CROSS-REFERENCE TO RELATED APPLICATIONS

The present application is based on PCT filing PCT/JP2022/037391, filed on Oct. 6, 2022, which claims the priority to the Japanese Patent Application No. 2021-212496, filed on Dec. 27, 2021, the entire contents of each are incorporated herein by reference.

TECHNICAL FIELD

The present disclosure relates to a security apparatus, a management apparatus, a communication system, and a security management method.

BACKGROUND ART

Patent literature 1 (WO 2021/166321) discloses the following technique. That is, a security system includes an information transmission apparatus, and a security apparatus to which a target device is connectable. The information transmission apparatus and the security apparatus are connected to each other via a network. The information transmission apparatus transmits, to the security apparatus, generation information to be used for generating reference identification information. The security apparatus generates the reference identification information by using the generation information received from the information transmission apparatus via the network. The security apparatus acquires identification information of the target device connected to the security apparatus. The security apparatus compares the acquired identification information with the generated reference identification information, and determines validity of the target device connected thereto, based on a result of comparison.

CITATION LIST

Patent Literature

Patent Literature 1: WO 2021/166321

SUMMARY OF INVENTION

A security apparatus of the present disclosure includes a plurality of communication ports configured to be capable of connecting devices, a switching unit configured to be capable of communicating with the plurality of devices via the plurality of respective communication ports, and an authentication unit configured to acquire a connection command to be given to at least any one device among the plurality of devices, the connection command including authentication information, and to perform authentication of the connection command on the basis of the authentication information. The authentication unit is configured to, when the authentication is successful, set a communication range of the at least any one device via the switching unit in accordance with the connection command, the communication range being formed by the switching unit.

An aspect of the present disclosure can be implemented not only as a security apparatus including such characteristic processing units, but also as a program for causing a computer to execute steps of such characteristic processing.

In addition, an aspect of the present disclosure may be implemented as a semiconductor integrated circuit that implements a part or all of the security apparatus, or may be implemented as a system including the security apparatus.

DETAILED DESCRIPTION

Figure 1:
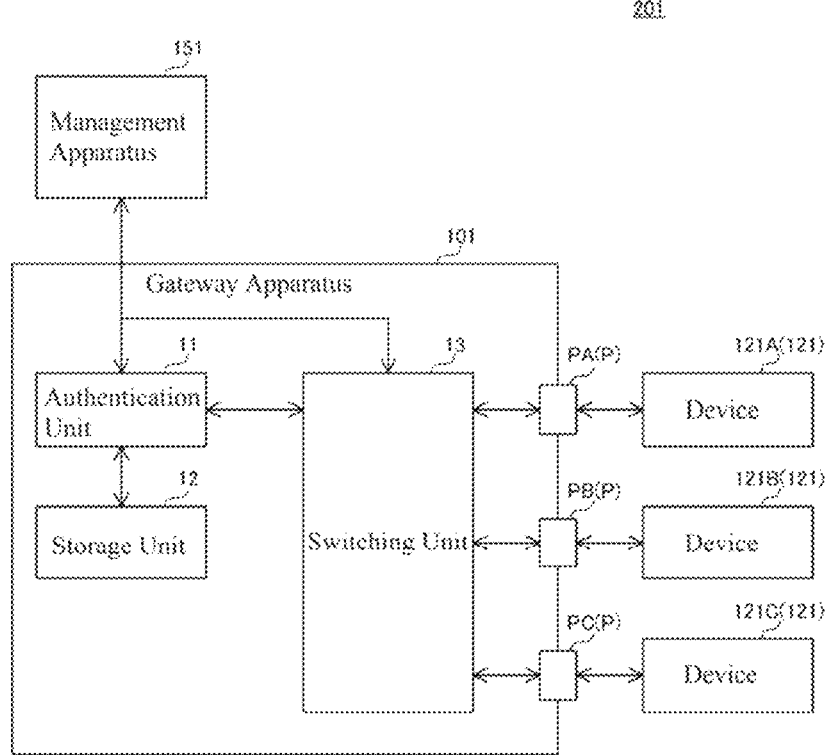
FIG. 1 is a diagram showing a configuration of a communication system according to a first embodiment of the present disclosure.

To date, technologies for improving security in networks have been developed.

Problems to be Solved by Present Disclosure

Beyond the technology described in Patent Literature 1, there is a demand for a technology that can achieve an excellent function regarding security in a network.

The present disclosure has been made to solve the above problem, and an object of the present disclosure is to provide a security apparatus, a management apparatus, a communication system, and a security management method that can achieve an excellent function regarding security in a network.

Advantageous Effects of Present Disclosure

According to the present disclosure, it is possible to realize an excellent function regarding security in a network.

DESCRIPTION OF EMBODIMENTS OF PRESENT DISCLOSURE

First, contents of embodiments of the present disclosure are listed and described.

(1) A security apparatus according to an embodiment of the present disclosure includes a plurality of communication ports configured to be capable of connecting devices, a switching unit configured to be capable of communicating with the plurality of devices via the plurality of respective communication ports, and an authentication unit configured to acquire a connection command to be given to at least any one device among the plurality of devices, the connection command including authentication information, and to perform authentication of the connection command on the basis of the authentication information. The authentication unit is configured to, when the authentication is successful, set a communication range of the at least any one device via the switching unit in accordance with the connection command, the communication range being formed by the switching unit.

In this way, by a configuration in which an authentication function and a path control function are integrated, for example, in a case where the connection command is acquired in a state where communication of each of the devices is cut off in a normal time, and an authentication of the connection command is successful, the communication range can be set so that the communication path of the device via the switching unit is secured. Accordingly, since it is possible to shorten the time during which the device can communicate via the switching unit, even when a certain device is infected with malware, it is possible to prevent infection of other devices and reduce frequency of incidents.

Further, since the communication range of each of devices changes, a configuration of a network including the security apparatus and the plurality of devices is difficult to understand for outsiders. Therefore, unauthorized access or the like from the outside to the network can be prevented more reliably, and the tamper resistance can be improved. Therefore, it is possible to achieve an excellent function regarding security in the network.

(2) In the above (1), the connection command may include status information indicating the communication range.

In this way, the communication range of each of the devices can be easily changed in the security apparatus by a configuration in which the communication range of each of the devices via switching unit is determined and instructed to the security apparatus by a side transmitting the connection command.

(3) In the above (1) or (2), the connection command may include timing information indicating a timing of changing the communication range.

With such a configuration, the communication range of each of the devices via the switching unit can be changed at a more appropriate timing in accordance with an operation state or the like of the applied system. For example, in the system, in the case of an abnormality in the change of the communication range, or in the case of failure in the authentication of the connection command, or the like, the side transmitting the connection command can easily recognize that the abnormality is in the operation state. Further, it is possible to prevent influence from the device which is not related to the operation state.

(4) In any one of the above (1) to (3), the authentication unit may be configured to acquire divided pieces of the authentication information.

With such a configuration, for example, even when a part of the divided pieces of the authentication information is leaked to the outsiders, the outsiders cannot understand the whole of the authentication information, and thus security can be improved.

(5) In the above (4), the authentication unit may be configured to perform the authentication further on the basis of at least any one of acquisition order and an acquisition interval of the divided pieces of the authentication information.

With such a configuration, a condition for authenticating the connection command can be made more complicated, and thus unauthorized access or the like can be prevented more reliably.

(6) In any one of the above (1) to (5), the security apparatus may include the three or more communication ports, and the authentication unit may be configured to disable communication by some of the three or more devices via the switching unit, in accordance with the connection command when the authentication is successful.

With such a configuration, when the authentication of the connection command is successful, for example, only a communication path of any one pair of devices to be communicated with each other can be secured without making all the devices communicable, and thus occurrence of incidents can be further reduced.

(7) A management apparatus according to an embodiment of the present disclosure is a management apparatus in a communication system including a security apparatus configured to be capable of communicating with a plurality of devices and to be capable of setting a communication range of each of the devices via the security apparatus. The management apparatus is configured to transmit, to the security apparatus, a connection command to be given to at least any one device among the plurality of devices, the connection command including authentication information.

In this way, by a configuration in which the connection command to the device including the authentication information is transmitted to the security apparatus, an authentication function and a path control function can be integrated in the security apparatus. For example, in a state where the communication of each of the devices is cut off in the security apparatus in a normal time, when the connection command is acquired and the authentication of the connection command is successful, the communication range can be set so that the communication path of the device via the security apparatus is secured. This makes it possible to shorten the time during which the device can communicate via the security apparatus, and therefore, even when a certain device is infected with malware, it is possible to prevent infection of other devices and reduce frequency of incidents.

Further, since the communication range of each of the devices can be changed in the security apparatus, a configuration of a network including the security apparatus and the plurality of devices is difficult to understand for the outsiders. Unauthorized access or the like from the outside to the network can be prevented more reliably, and the tamper resistance can be improved. Therefore, it is possible to achieve an excellent function regarding security in the network.

(8) A communication system according to an embodiment of the present disclosure includes a management apparatus, and a security apparatus including a plurality of communication ports configured to be capable of connecting devices, and a switching unit configured to be capable of communicating with the plurality of devices via the plurality of respective communication ports. The management apparatus is configured to transmit, to the security apparatus, a connection command to be given to at least any one device among the plurality of devices, the connection command including authentication information, the security apparatus is configured to perform, on the basis of the authentication information included in the connection command received from the management apparatus, authentication of the connection command, and the security apparatus is configured to, when the authentication is successful, set a communication range of the at least any one device via the switching unit in accordance with the connection command, the communication range being formed by the switching unit.

In this way, by a configuration in which an authentication function and a path change function are integrated in the security apparatus, for example, when the connection command is acquired in a state where the path to each of the devices is disconnected in a normal time and the authentication of the connection command is successful, the communication range of the device via the switching unit can be set so as to connect the path to the device. This makes it possible to shorten the time during which a plurality of devices are connected to each other, and therefore, even when a certain device is infected with malware, it is possible to prevent infection of other devices and reduce frequency of incidents.

In addition, since the communication range of each of the devices changes, a configuration of a network including the security apparatus and the plurality of devices is difficult to understand for the outsiders. Unauthorized access or the like from the outside to the network can be prevented more reliably, and the tamper resistance can be improved. Therefore, it is possible to realize an excellent function regarding security in the network.

(9) A security management method according to an embodiment of the present disclosure is a security management method in a security apparatus including a plurality of communication ports configured to be capable of connecting devices, and a switching unit configured to be capable of communicating with the plurality of devices via the plurality of respective communication ports, the security management method includes obtaining a connection command to be given to at least any one device among the plurality of devices, the connection command including authentication information, performing authentication of the connection command on the basis of the obtained authentication information, and when the authentication is successful, setting a communication range of the at least any one device via the switching unit in accordance with the connection command, the communication range being formed by the switching unit.

In this way, by performing the process integrating an authentication function and a path change function in the security apparatus, for example, when the connection command is acquired in a state where the path to each of the devices is disconnected in a normal time and the authentication of the connection command is successful, the communication range of the device via the switching unit can be set so as to connect the path to the device. This makes it possible to shorten the time during which a plurality of devices are connected to each other, and therefore, even when a certain device is infected with malware, it is possible to prevent infection of other devices and reduce frequency of incidents.

Further, since the communication range of each of the devices changes, a configuration of a network including the security apparatus and the plurality of devices is difficult to understand for the outsiders. Unauthorized access or the like from the outside to the network can be prevented more reliably, and the tamper resistance can be improved. Therefore, it is possible to achieve an excellent function regarding security in the network.

Hereinafter, embodiments of the present disclosure will be described with reference to the drawings. In the drawings, the same or corresponding parts are denoted by the same reference numerals, and the description thereof will not be repeated. At least a part of the embodiments described below may be arbitrarily combined.

First Embodiment

[Configuration and Basic Operation]

FIG. 1 is a diagram showing a configuration of a communication system according to a first embodiment of the present disclosure.

Referring to FIG. 1, a communication system 201 includes a gateway apparatus 101, a plurality of devices 121, and a management apparatus 151. In FIG. 1, as an example, three devices 121, namely, devices 121A, 121B, and 121C are shown. Communication system 201 may include two or four or more devices 121.

Communication system 201 is used for a production management system using manufacturing resource planning (MRP) in a factory, a power plant, or the like, for example. Communication system 201 may be used for a communication system in a house, an in-vehicle communication system, or the like.

The plurality of devices 121 are connected to gateway apparatus 101 via corresponding cables. The cable is, for example, an Ethernet (registered trademark) cable.

Gateway apparatus 101 is an example of a security apparatus, and ensures security in communication system 201. More specifically, gateway apparatus 101 includes an authentication unit 11, a storage unit 12, a switching unit 13, and three communication ports P. Authentication unit 11 is implemented by, for example, processing circuitry including one or more processors. Storage unit 12 is, for example, a non-volatile memory.

Devices 121A, 121B, and 121C are connected to communication ports PA, PB, and PC, respectively, which are three communication ports P.

Switching unit 13 performs a relay process of relaying information exchanged between the plurality of devices 121. Switching unit 13 is, for example, a crossbar switch including a plurality of switches, and changes a connection state between each of devices 121 via switching unit 13 and a connection state between management apparatus 151 and each of devices 121 via switching unit 13 by switching on and off the switches. In a normal time, a path between each of devices 121 via switching unit 13 and a path between management apparatus 151 and each of devices 121 via switching unit 13 are disconnected.

Management apparatus 151 is an apparatus that instructs working content to device 121, and for example, a part or all of the functions are provided by cloud computing.

Device 121 is a robot, a controller of the robot, an actuator, a programmable logic controller (PLC), an electronic control unit (ECU) to which a sensor is connected, or the like that operates in accordance with an instruction from management apparatus 151.

Management apparatus 151 transmits a connection command that changes in accordance with the state of one or more devices 121 to gateway apparatus 101. More specifically, management apparatus 151, for example, determines a working content to be instructed to each of devices 121 in accordance with an operation state of each of devices 121 (hereinafter, also referred to as "operation mode"), and transmits the connection command in accordance with the determined working content to gateway apparatus 101.

The connection command includes authentication information used for authentication of the connection command, the connection state between each of devices 121 via switching unit 13, and the connection state between management apparatus 151 and each of devices 121 via switching unit 13, that is, status information indicating a communication range CR of each of devices 121 to be adopted in switching unit 13, and timing information indicating a timing when communication range CR is to be changed. The timing information includes, for example, a start timing and an end timing represented by a relative time with respect to the connection command. The connection command is not limited to the one including the authentication information, the status information, and the timing information, and may include, for example, two or more authentication codes as the authentication information, or may include the authentication information and one of the status information and the timing information.

Authentication unit 11 in gateway apparatus 101 receives the connection command transmitted from management apparatus 151, and performs the authentication of the connection command on the basis of the authentication information included in the received connection command.

More specifically, storage unit 12 stores, for example, a determination criteria for determining that authentication is successful in the authentication of the connection command.

Authentication unit 11 performs the authentication of the connection command on the basis of the authentication information by referring to the determination criteria stored in storage unit 12, for example, and when the authentication is successful, sets communication range CR of device 121 via switching unit 13 in accordance with the connection command, that is, changes one or more paths formed in switching unit 13.

More specifically, the status information included in the connection command indicates, for example, identification information of each of devices 121 (hereinafter, referred to as "device ID") that is an instruction target of the working content. The status information is not limited to the device ID, and may indicate, for example, a port number of communication port P corresponding to each of devices 121. When the status information indicates the device ID, for example, gateway apparatus 101 holds information indicating correspondence between the device ID and the port number, and transmits information such as the connection command to destination device 121 using the information.

When the authentication of the connection command is successful, authentication unit 11 specifies device 121 connected to a network SN including switching unit 13 on the basis of the status information included in the connection command. Then, authentication unit 11 changes communication range CR formed by switching unit 13 so that the specified device 121 can communicate via switching unit 13 at the start timing indicated by the timing information included in the connection command.

For example, when three or more devices 121 are connected to switching unit 13, authentication unit 11 changes communication range CR so that communication by some devices 121 among three or more devices 121 via switching unit 13 is disabled.

When the change of communication range CR is completed, authentication unit 11 transmits a connection completion notification to management apparatus 151.

When management apparatus 151 receives the connection completion notification transmitted from gateway apparatus 101, management apparatus 151 transmits, for example, the device ID of each of devices 121 that is an instruction target of the working content and the working information indicating the working content to gateway apparatus 101.

Upon receiving the working information transmitted from management apparatus 151, switching unit 13 in gateway apparatus 101 transmits the working information to one or more devices 121 on the basis of destination information included in the working information. Switching unit 13 may be configured to transmit the working information to one or more devices 121 corresponding to communication range CR regardless of the destination information.

For example, when device 121 to be instructed by the working content operates in accordance with control information from another device 121 which is a controller for controlling the operation of device 121, management apparatus 151 creates the status information indicating communication range CR in which device 121, the other device 121, and management apparatus 151 can communicate with each other, and sets the destination indicated by the working information to the controller. In this case, when the authentication of the connection command is successful, authentication unit 11 specifies device 121 connected to network SN and the other device 121 on the basis of the status information included in the connection command. Then, authentication unit 11 changes communication range CR formed by switching unit 13 so that the specified device 121, the other device 121, and management apparatus 151 can communicate with each other at the start timing indicated by the timing information included in the connection command. Then, the other device 121 as the controller transmits the control information to device 121 as the instruction target of the working content via gateway apparatus 101 on the basis of the working information from gateway apparatus 101.

When device 121 receives the working information transmitted from management apparatus 151 or the control information transmitted from the other device 121, operates in accordance with the working content indicated by the working information or the control information, and transmits response information to gateway apparatus 101.

For example, when the working information indicates the start of the operation of device 121, device 121 that has received the working information or the control information based on the working information starts the operation in accordance with the received working information or control information. When the working information indicates the stop of the operation of device 121, device 121 that has received the working information or the control information on the basis of the working information stops the operation in accordance with the received working information or control information.

Switching unit 13 in gateway apparatus 101 receives the response information from device 121 and transmits the response information to management apparatus 151.

Authentication unit 11 changes communication range CR so that the communication of device 121 via switching unit 13 is disabled at the end timing indicated by the timing information included in the connection command. Then, when the change of communication range CR is completed, authentication unit 11 transmits a disconnection completion notification to management apparatus 151.

In this way, gateway apparatus 101 separates authentication and routing control system from general routing system used for communication and the like. Specifically, authentication unit 11 and switching unit 13 are separately provided.

In gateway apparatus 101, device 121 which is not the target of the communication range indicated by the connection command is not connected to the outside, and therefore, a configuration of a network of communication system 201 is hardly understood for the outsiders, and unauthorized access or the like for the outsiders to the network can be prevented more reliably. Further, unauthorized access or the like to the authentication and routing control system can be prevented more reliably.

The connection command may not include the timing information. In this case, for example, when the authentication of the connection command is successful, authentication unit 11 changes communication range CR after a predetermined time from the timing at which the authentication is performed.

The connection command does not have to include the status information. For example, communication system 201 includes two devices 121. In this case, for example, when the authentication of the connection command is successful, authentication unit 11 changes communication range CR so that communication via switching unit 13 of each of two devices 121 is enabled or disabled at the timing indicated by the timing information included in the connection command.

Further, for example, when communication system 201 includes three or more devices 121 and the connection command does not include the status information, authentication unit 11 may be configured to change communicable range CR so that the communication via switching unit 13 of each of three or more devices 121 is enabled or disabled at the timing indicated by the timing information included in the connection command.

The security apparatus may be an apparatus other than gateway apparatus 101. For example, the security apparatus may be an apparatus that is provided in a power supply system for supplying power to a plurality of devices 121 and connects or disconnects the power supply path between the plurality of devices 121.

[Flow of Operation]

Figure 2:
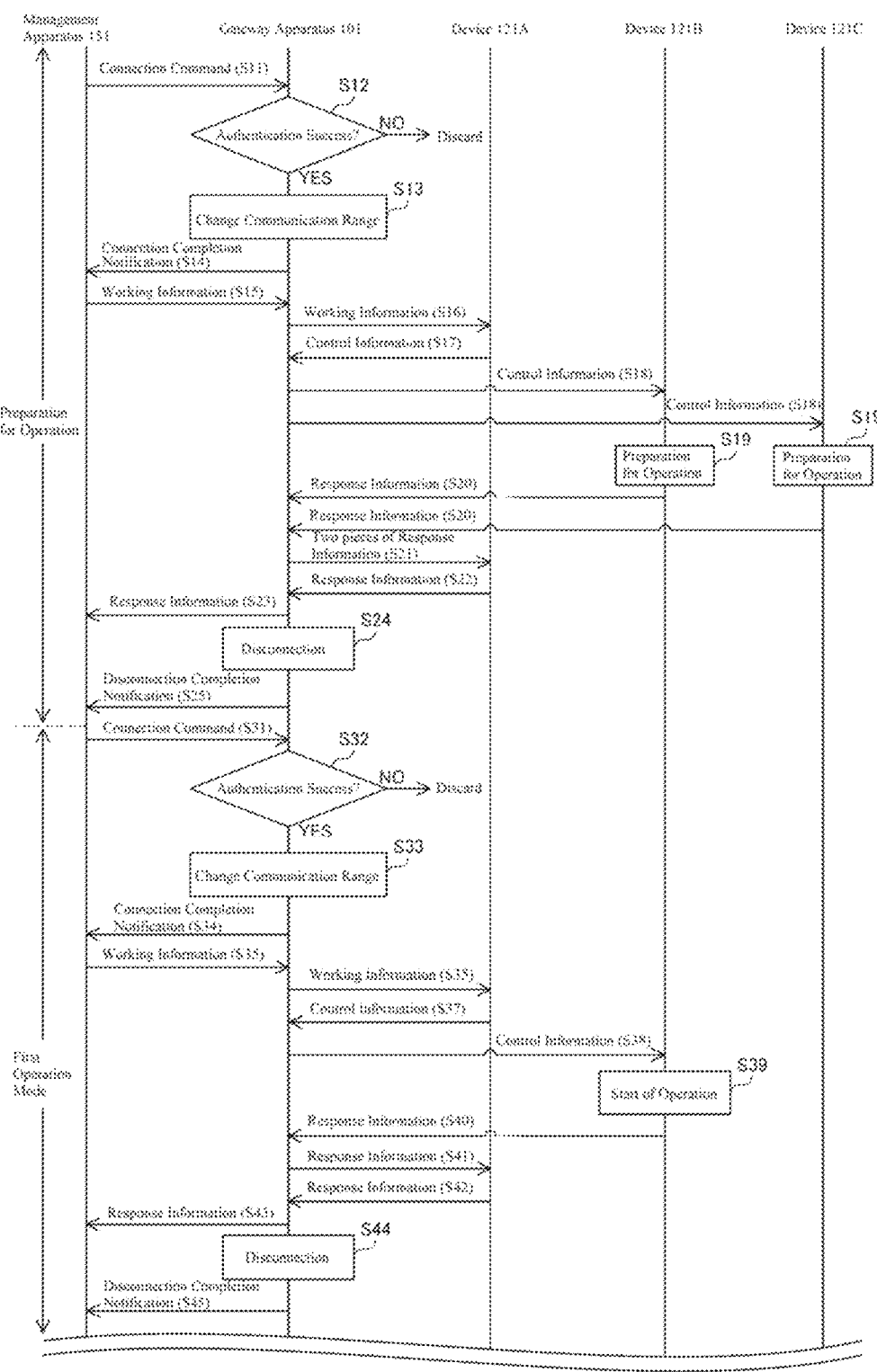
FIG. 2 is a sequence diagram defining an example of a working procedure of each apparatus in a communication system according to a first embodiment of the present disclosure.
Figure 3:
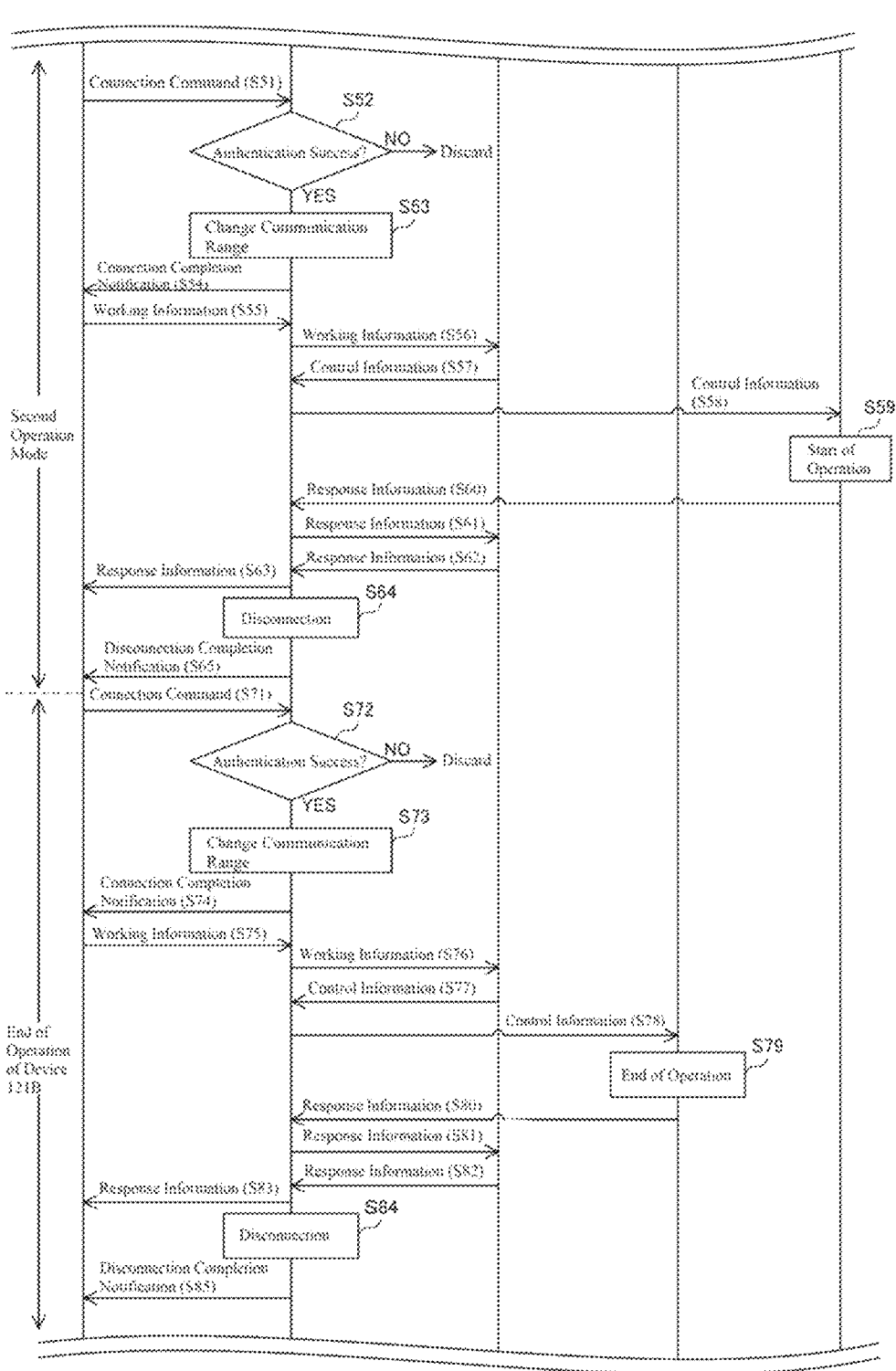
FIG. 3 is a sequence diagram defining an example of a working procedure of each apparatus in a communication system according to a first embodiment of the present disclosure.
Figure 4:
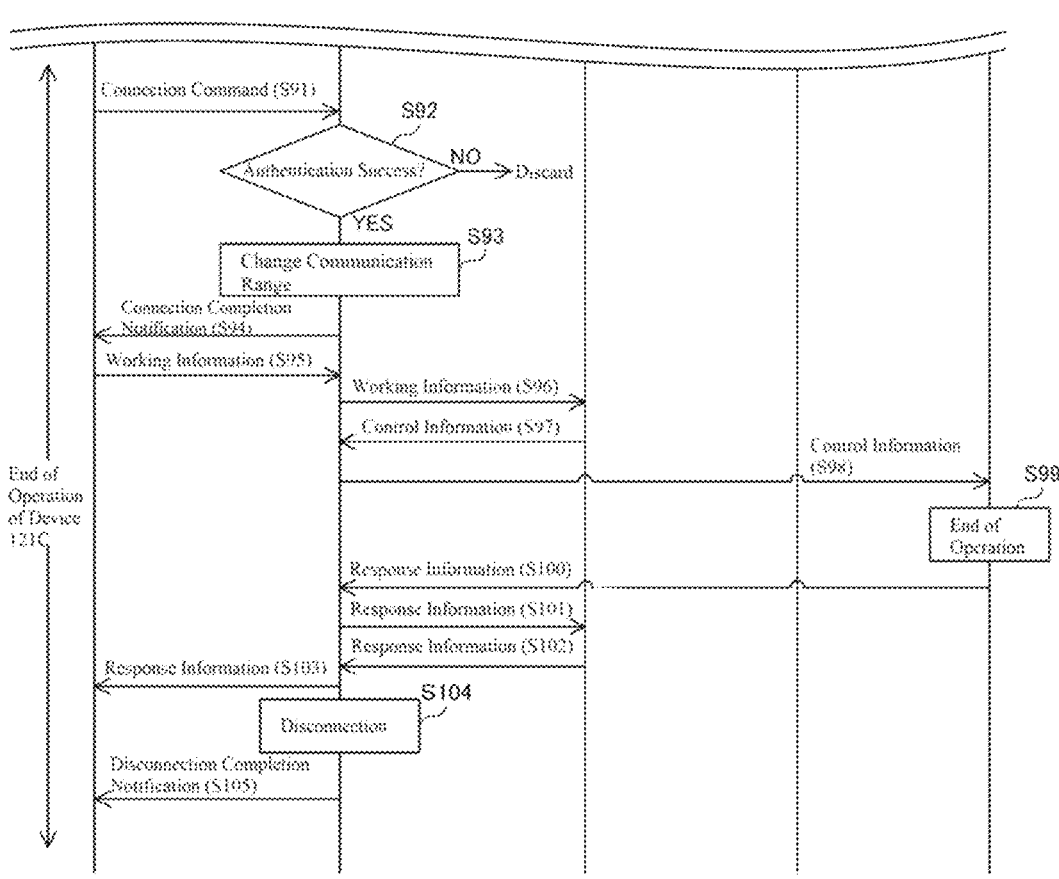
FIG. 4 is a sequence diagram defining an example of a working procedure of each apparatus in a communication system according to a first embodiment of the present disclosure.

FIGS. 2, 3 and 4 are sequence diagrams each defining an example of a working procedure of each apparatus in the communication system according to the first embodiment of the present disclosure. FIG. 3 shows a continuation of the sequence diagram shown in FIG. 2, and FIG. 4 shows a continuation of the sequence diagram shown in FIG. 3.

It is assumed that, among three devices 121A, 121B, and 121C in communication system 201, devices 121B and 121C are robots, and device 121A is a controller that controls operations of devices 121B and 121C.

(Preparation for Operation)

Referring to FIGS. 2 and 3, first, management apparatus 151 causes that device 121A instructs devices 121B and 121C to perform preparation for operation as the operation mode in a state where all the paths between each of devices 121 via switching unit 13 and the paths between management apparatus 151 and device 121 via switching unit 13 are disconnected and devices 121B and 121C stop operating. In this case, management apparatus 151 transmits, for example, the status information indicating the device IDs of each of devices 121A, 121B, and 121C and the connection command including the authentication information to gateway apparatus 101 (Step S11).

Next, when gateway apparatus 101 receives the connection command transmitted from management apparatus 151, gateway apparatus 101 performs the authentication of the connection command on the basis of the authentication information included in the connection command (Step S12).

Next, when gateway apparatus 101 fails in the authentication of the connection command ("NO" in Step S12), gateway apparatus 101 discards the connection command, for example, and does not change communication range CR.

On the other hand, when the authentication of the connection command is successful ("YES" in Step S12), gateway apparatus 101 specifies devices 121A, 121B, and 121C as devices 121 to be connected to network SN on the basis of the status information included in the connection command.

Then, gateway apparatus 101 changes communication range CR so that each of devices 121A, 121B, and 121C can communicate via switching unit 13 at the start timing indicated by the timing information included in the connection command (Step S13).

Next, gateway apparatus 101 transmits the connection completion notification to management apparatus 151 (Step S14).

Next, when management apparatus 151 receives the connection completion notification transmitted from gateway apparatus 101, management apparatus 151 transmits, for example, the working information indicating the device IDs of each of devices 121B and 121C and the preparation for operation to gateway apparatus 101 with device 121A as the destination (Step S15).

Next, when gateway apparatus 101 receives the working information transmitted from management apparatus 151, gateway apparatus 101 transmits the working information to device 121A (Step S16).

Next, when device 121A receives the working information transmitted from gateway apparatus 101, device 121A transmits the control information instructing the preparation for operation to gateway apparatus 101 with devices 121B and 121C as the destinations in accordance with the working information (Step S17).

Next, when gateway apparatus 101 receives the control information transmitted from device 121A, gateway apparatus 101 performs the relay process of transmitting the control information to devices 121B and 121C (Step S18).

Next, when devices 121B and 121C receive the control information transmitted from device 121A via gateway apparatus 101, devices 121B and 121C perform the preparation for operation in accordance with the control information (Step S19), and transmit the response information to gateway apparatus 101 with device 121A as the destination (Step S20).

Next, when gateway apparatus 101 receives the response information transmitted from each of devices 121B and 121C, gateway apparatus 101 performs the relay process of transmitting the response information to device 121A (Step S21).

Next, when device 121A receives the response information transmitted from each of devices 121B and 121C via gateway apparatus 101, device 121A transmits the response information corresponding to the working information from management apparatus 151 to gateway apparatus 101 with management apparatus 151 as the destination (Step S22).

Next, gateway apparatus 101 transmits the response information received from device 121A to management apparatus 151 (Step S23).

Next, gateway apparatus 101 changes communication range CR so that the communication of each of devices 121A, 121B, and 121C via switching unit 13 is disabled at the end timing indicated by the timing information included in the connection command (Step S24).

Then, gateway apparatus 101 transmits the disconnection completion notification to management apparatus 151 (Step S25).

(First Operation Mode)

Next, when instructing device 121B to perform a start of operation as a first operation mode, management apparatus

151 transmits the connection command including status information indicating the device IDs of each of devices 121A and 121B and the authentication information to gateway apparatus 101 (Step S31).

Next, when gateway apparatus 101 receives the connection command from management apparatus 151, gateway apparatus 101 performs the authentication of the connection command using the authentication information included in the connection command (Step S32).

Next, when gateway apparatus 101 fails in the authentication of the connection command ("NO" in Step S32), gateway apparatus 101 discards the connection command, for example, and does not change communication range CR.

On the other hand, when the authentication of the connection command is successful ("YES" in Step S32), gateway apparatus 101 specifies devices 121A and 121B as devices 121 to be connected to network SN on the basis of the status information included in the connection command.

Then, gateway apparatus 101 changes communication range CR so that each of devices 121A and 121B can communicate via switching unit 13 at the start timing indicated by the timing information included in the connection command (Step S33).

Next, gateway apparatus 101 transmits the connection completion notification to management apparatus 151 (Step S34).

Next, when management apparatus 151 receives the connection completion notification from gateway apparatus 101, management apparatus 151 transmits, for example, working information indicating the device ID of device 121B and the start of operation to gateway apparatus 101 with device 121A as the destination (Step S35).

Next, when gateway apparatus 101 receives the working information from management apparatus 151, gateway apparatus 101 transmits the working information to device 121A (Step S36).

Next, when device 121A receives the working information from gateway apparatus 101, device 121A transmits control information instructing to perform the start of operation to gateway apparatus 101 with device 121B as the destination in accordance with the working information (Step S37).

Next, when gateway apparatus 101 receives the control information from device 121A, gateway apparatus 101 performs the relay process of transmitting the control information to device 121B (Step S38).

Next, when device 121B receives the working information from device 121A via gateway apparatus 101, device 121B starts operation in accordance with the working information (Step S39), and transmits the response information to gateway apparatus 101 with device 121A as the destination (Step S40).

Next, when gateway apparatus 101 receives the response information from device 121B, gateway apparatus 101 performs the relay process for transmitting the response information to device 121A (Step S41).

Next, when device 121A receives the response information from device 121B via gateway apparatus 101, device 121A transmits the response information to the working information from management apparatus 151 to gateway apparatus 101 with management apparatus 151 as the destination (Step S42).

Next, gateway apparatus 101 transmits the response information received from device 121A to management apparatus 151 (Step S43).

Next, gateway apparatus 101 changes communication range CR so that the communication of each of devices

121A and 121B via switching unit 13 is disabled at the end timing indicated by the timing information included in the connection command (Step S44).

Then, gateway apparatus 101 transmits the disconnection completion notification to management apparatus 151 (Step S45).

(Second Operation Mode)

Next, when instructing device 121C to perform the start of operation as a second operation mode, management apparatus 151 transmits the connection command including the status information indicating the device ID of device 121C and the authentication information to gateway apparatus 101 (Step S51).

The operation from Step S52 to Step S65 is the same as the operation from Step S32 to Step S45 described above, and "device 121B" in the description of the operation from Step S32 to Step S45 is replaced with "device 121C".

(End of Operation of Device 121B)

Next, when instructing device 121B to perform an end of operation as the operation mode, management apparatus 151 transmits the connection command including the status information indicating the device ID of device 121B and the authentication information to gateway apparatus 101 (Step S71).

The operation from Step S72 to Step S85 is the same as the operation from Step S32 to Step S45 described above, and "start of operation" in the description of the operation from Step S32 to Step S45 is replaced with "end of operation".

(End of Operation of Device 121C)

Next, when instructing device 121C to perform the end of operation as the operation mode, management apparatus 151 transmits the connection command including the status information indicating the device ID of device 121C and the authentication information to gateway apparatus 101 (Step S91).

The operation from Step S92 to Step S105 is the same as the operation from Step S32 to Step S45 described above, and "start of operation" in the description of the operation from Step S32 to Step S45 is replaced with "end of operation", and "device 121B" is replaced with "device 121C".

Gateway apparatus 101 is not limited to a configuration in which gateway apparatus 101 does not change communication range CR when the authentication of the connection command fails. Gateway apparatus 101 may be configured to change communication range CR so that, for example, only a monitoring apparatus (not shown) that detects an unauthorized access in communication system 201 can communicate when the authentication of the connection command fails.

Further, devices 121B and 121C are not limited to a configuration of operating in accordance with the control information from device 121A, and may be configured to acquire working information from management apparatus 151 without going through device 121A and operate in accordance with the acquired working information.

The connection command may include the status information and the timing information indicating a sequence in which the connection state and the timing are matched. Specifically, the status information includes the connection information indicating the connection state of switching unit 13 and the operation information indicating the operation state of the entire applied system such as the operation mode. In this case, gateway apparatus 101 and each of devices 121 perform the processing as shown in FIGS. 2, 3 and 4 in accordance with one connection command from management apparatus 151.

Switching unit 13 is not limited to the configuration including a physical switch, and may be a switch that selects a port to be an output destination of information and outputs the information to the selected port, such as an Ethernet switch. In this case, for example, switching unit 13 changes a VLAN group on the basis of the status information and the timing information included in the connection command, thereby setting communication range CR of device 121.

In addition, communication system 201 may be configured such that a plurality of communication ranges CR are provided in parallel. In this case, authentication unit 11 receives, for example, the connection command including one piece of authentication information, the status information indicating a plurality of communication range CRs, and the timing information indicating the timing when each of the plurality of communication range CRs is to be changed from management apparatus 151, and sets the plurality of communication range CRs when authentication of the connection command is successful.

Gateway apparatus 101 is not limited to the configuration in which communication range CR is changed so that the communication with device 121 is enabled at the start timing indicated by the timing information included in one connection command received from management apparatus 151, and communication range CR is changed so that the communication with device 121 is disconnected at the end timing indicated by the timing information included in the same connection command.

For example, gateway apparatus 101 may be configured to change communication range CR on the basis of another connection command when gateway apparatus 101 receives the another connection command from management apparatus 151 during a period from the change of communication range CR at the start timing to the arrival of the end timing.

More specifically, for example, after changing communication range CR so that devices 121A and 121B can communicate via switching unit 13 in the sequence of the "first operation mode" shown in FIG. 2 (Step S33), when receiving the connection command instructing to perform the start of operation of device 121C in the sequence of the "second operation mode" shown in FIG. 3 from management apparatus 151 (Step S51), gateway apparatus 101 performs authentication processing of the connection command (Step S52).

Next, when the authentication of the connection command instructing to perform the start of operation of device 121C is successful (YES in Step S52), gateway apparatus 101 specifies devices 121A and 121C as devices 121 to be connected to network SN on the basis of the status information included in the connection command.

Next, gateway apparatus 101 changes communication range CR so as to disconnect the communication with device 121B, and changes communication range CR so that devices 121A and 121C can communicate via switching unit 13.

Gateway apparatus 101 may be configured to be switchable between a normal mode in which gateway apparatus 101 performs the relay process without performing the authentication process and a security mode in which gateway apparatus 101 performs the authentication process.

Next, other embodiments of the present disclosure will be described with reference to the drawings. In the drawings, the same or corresponding parts are denoted by the same reference numerals, and the description thereof will not be repeated.

Second Embodiment

In the first embodiment, the configuration in which gateway apparatus 101 performs the authentication of the connection command on the basis of authentication information included in the connection command from management apparatus 151 has been described.

In contrast, in a second embodiment, authentication information is divided into a plurality of pieces, and a gateway apparatus 102 acquires the pieces of authentication information (hereinafter, also referred to as "partial authentication information") and performs authentication of the connection command from management apparatus 151 on the basis of the pieces of acquired partial authentication information. The contents other than the contents described below are the same as communication system 201 according to the first embodiment.

For example, the pieces of partial authentication information are stored in independent spaces that are secured differently from each other. This can reduce a risk of leakage of authentication information. Here, it is assumed that authentication information is divided into two pieces of partial authentication information, the first partial authentication information is stored in a physical space, and the second partial authentication information is stored in a cyberspace.

Specifically, it is assumed that the first partial authentication information is stored in an authentication card, a read only memory (ROM), or the like owned by an administrator of a communication system 202 according to the second embodiment. Further, it is assumed that the second partial authentication information is stored in management apparatus 151.

[Configuration and Operation]

Figure 5:
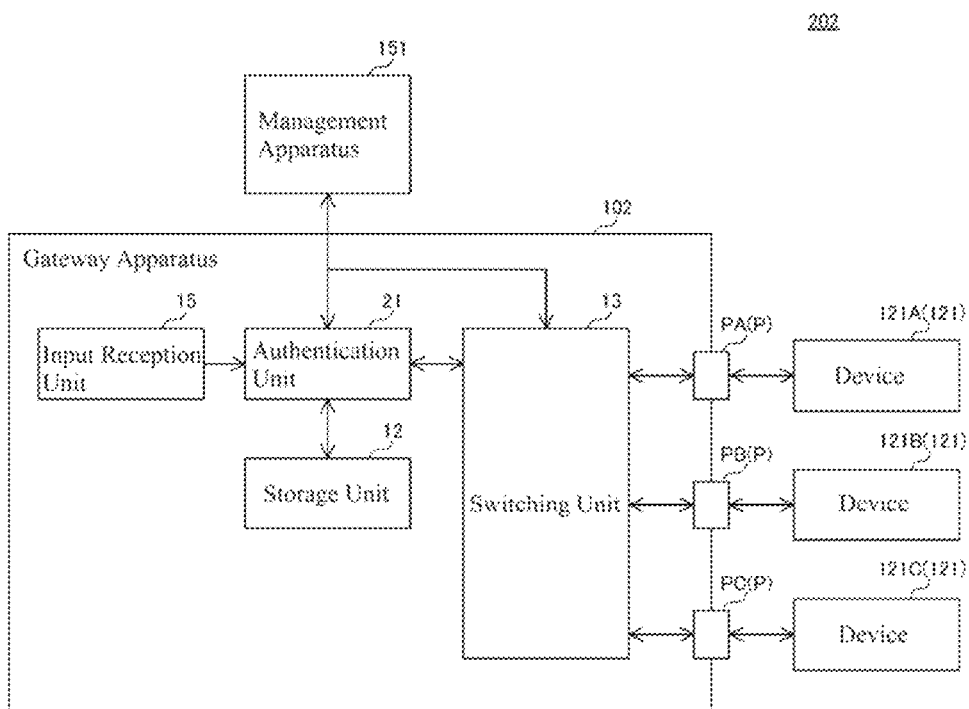
FIG. 5 is a diagram showing a configuration of a gateway apparatus according to a second embodiment of the present disclosure.

FIG. 5 is a diagram showing a configuration of a gateway apparatus according to a second embodiment of the present disclosure.

Referring to FIG. 5, gateway apparatus 102 according to the second embodiment includes storage unit 12, switching unit 13, and communication ports PA, PB, and PC, similarly to gateway apparatus 101 according to the first embodiment of the present disclosure. Gateway apparatus 102 includes an authentication unit 21 instead of authentication unit 11, and further includes an input reception unit 15.

For example, the authentication card of the administrator of communication system 202 can be inserted into input reception unit 15. In the authentication card, the first partial authentication information, which is a part of the authentication information used in authentication by gateway apparatus 102, is registered.

When the authentication card is inserted, input reception unit 15 reads the first partial authentication information registered in the authentication card and outputs the first partial authentication information to authentication unit 21.

When transmitting a connection command to gateway apparatus 102, management apparatus 151 transmits the connection command including the second partial authentication information.

When authentication unit 21 in gateway apparatus 102 receives the connection command transmitted from management apparatus 151, authentication unit 21 combines the second partial authentication information included in the connection command and the first partial authentication information output from input reception unit 15 to create the authentication information. Then, authentication unit 21 refers to a determination criteria stored in storage unit 12 and performs authentication of the connection command on the basis of the created authentication information.

Further, for example, it is assumed that the authentication card inserted into input reception unit 15 is not an official authentication card, and partial authentication information different from the first partial authentication information registered in the official authentication card owned by the administrator is registered in the authentication card. In this case, it is determined that the authentication fails in the authentication on the basis of the authentication information created by authentication unit 21.

It is also assumed that the authentication card is not inserted in input reception unit 15 in a situation where gateway apparatus 102 receives the connection command from management apparatus 151. In this case, authentication unit 21 cannot create the authentication information, and therefore, determines that the authentication has failed in the authentication of the connection command.

Authentication unit 21 may be configured to create the authentication information by combining three or more pieces of partial authentication information.

Not only the authentication information, but also at least one of the status information and the timing information may be configured to be divided. In this case, input reception unit 15 reads at least one of the partial status information and the partial timing information and outputs the read information to authentication unit 21. When transmitting the connection command to gateway apparatus 102, management apparatus 151 transmits the connection command including the second partial authentication information and at least one of the partial status information and the partial timing information. When authentication unit 21 receives the connection command transmitted from management apparatus 151, authentication unit 21 combines the partial status information included in the connection command and the partial status information output from input reception unit 15 to create status information. When authentication unit 21 receives the connection command transmitted from management apparatus 151, authentication unit 21 combines the partial timing information included in the connection command and the partial timing information output from input reception unit 15 to create timing information.

Further, the present embodiment may also be configured to store the data in which the authentication code, the state information, and the timing information are collected in a distributed manner using, for example, a secret sharing technique. For example, in addition to management apparatus 151, the status information and the timing information are stored in other two management apparatuses, respectively. That is, authentication unit 21 may be configured to perform the authentication of the connection command on the basis of the status information and the timing information in addition to the authentication information. In this case, gateway apparatus 102 may be configured without storage unit 12. That is, authentication unit 21 performs the authentication of the connection command without using the above determination criteria.

[Flow of Operation]

(a) Example 1

Figure 6:
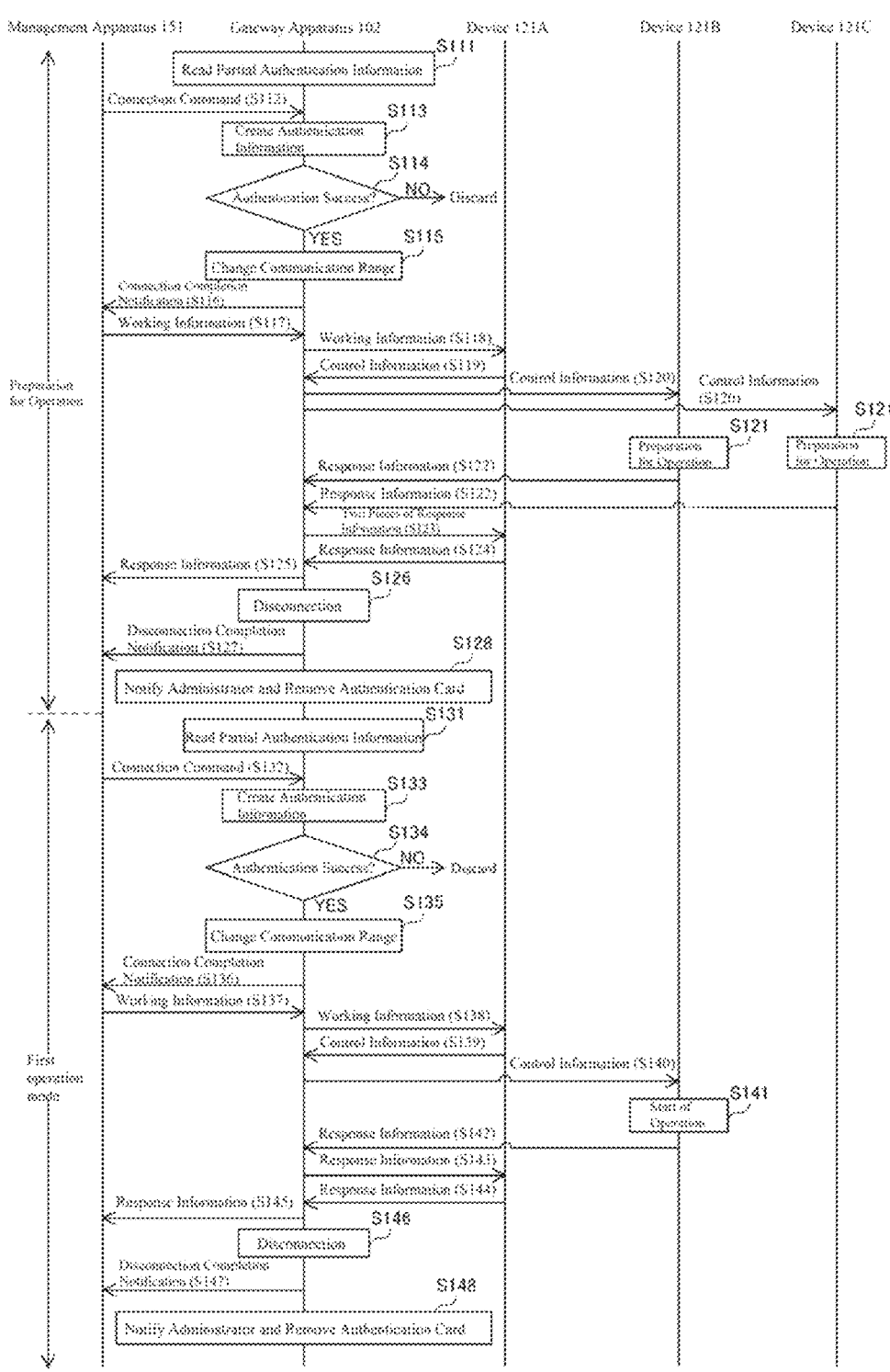
FIG. 6 is a sequence diagram defining an example of a working procedure of each apparatus in a communication system according to a second embodiment of the present disclosure.

FIG. 6 is a sequence diagram defining an example of a working procedure of each apparatus in the communication system according to the second embodiment of the present disclosure. FIG. 6 shows an example of the working procedure of each apparatus when the authentication is successful for all of a plurality of connection commands transmitted from management apparatus 151.

Here, as in the sequence diagram shown in FIG. 2, it is assumed that devices 121B and 121C among three devices 121A, 121B, and 121C in communication system 202 are robots, and device 121A is a controller that controls the operations of devices 121B and 121C.

(Preparation for Operation)

Referring to FIG. 6, first, when the authentication card of the administrator of communication system 202 is inserted, gateway apparatus 102 reads the first partial authentication information registered in the authentication card and holds the first partial authentication information. For example, the first partial authentication information is read from the authentication card only once when the authentication card is inserted (Step S111).

Next, when device 121A instructs devices 121B and 121C to perform the preparation for operation as the operation mode in a state where all the paths between each of devices 121 via switching unit 13 and the paths between management apparatus 151 and each of devices 121 via switching unit 13 are disconnected and devices 121B and 121C stop operating, management apparatus 151 transmits the connection command including the status information indicating the device IDs of each of devices 121A, 121B, and 121C and the second partial authentication information to gateway apparatus 101 (Step S112).

Next, when gateway apparatus 102 receives the connection command from management apparatus 151, gateway apparatus 102 acquires the second partial authentication information included in the connection command, and combines the acquired second partial authentication information and the first partial authentication information read from the authentication card in Step S111 to create the authentication information (Step S113).

Next, gateway apparatus 102 performs authentication processing of the connection command by using the created authentication information. The operations of each apparatus after the authentication of the connection command by gateway apparatus 102 (from Step S114 to Step S125) are the same as the operations from Step S12 to Step S23 shown in FIG. 2, and therefore, the detailed description thereof will not be repeated here.

Next, gateway apparatus 102 changes communication range CR so that the communication of each of devices 121A, 121B, and 121C via switching unit 13 is disabled at the end timing indicated by the timing information included in the connection command. Then, gateway apparatus 102 deletes the first partial authentication information read from the authentication card (Step S126).

Then, gateway apparatus 101 transmits the disconnection completion notification to management apparatus 151 (Step S127).

Next, gateway apparatus 102 notifies the administrator that the disconnection completion notification has been transmitted to management apparatus 151, for example, by displaying the notification on a monitor or the like (not shown). Then, the administrator knows that the disconnection completion notification has been transmitted to management apparatus 151, and removes the authentication card inserted in Step S111 from gateway apparatus 102 (Step S128).

(First Operation Mode)

Next, when the authentication card of the administrator is inserted again, gateway apparatus 102 reads the first partial authentication information registered in the authentication card and holds the first partial authentication information (Step S131).

Next, when instructing device 121B to perform the start of operation as the first operation mode, management apparatus 151 transmits the connection command including the status information indicating the device ID of device 121B and the second partial authentication information to gateway apparatus 102 (Step S132).

Next, when gateway apparatus 102 receives the connection command from management apparatus 151, gateway apparatus 102 acquires the second partial authentication information included in the connection command, and combines the acquired second partial authentication information and the first partial authentication information read from the authentication card in Step S131 to create the authentication information (Step S133).

Next, gateway apparatus 102 performs authentication processing of the connection command by using the created authentication information. The operations of the each apparatus after the authentication of the connection command by gateway apparatus 102 (from Step S134 to Step S147) are the same as the operations from Step S32 to Step S45 shown in FIG. 2, and thus the detailed description thereof will not be repeated here.

Next, gateway apparatus 102 notifies the administrator that the disconnection completion notification has been transmitted to management apparatus 151, for example, by displaying the notification on the monitor or the like (not shown). Then, the administrator knows that the disconnection completion notification has been transmitted to management apparatus 151, and removes the authentication card inserted in Step S131 from gateway apparatus 102 (Step S148).

In FIG. 6, the operation of each apparatus in the case where management apparatus 151 instructs the preparation for operation and the first operation mode as the operation mode has been described. Even when management apparatus 151 instructs the second operation mode, the end of operation of device 121B, and the end of operation of device 121C as the operation mode, each apparatus performs the same operation.

(b) Example 2

Figure 7:
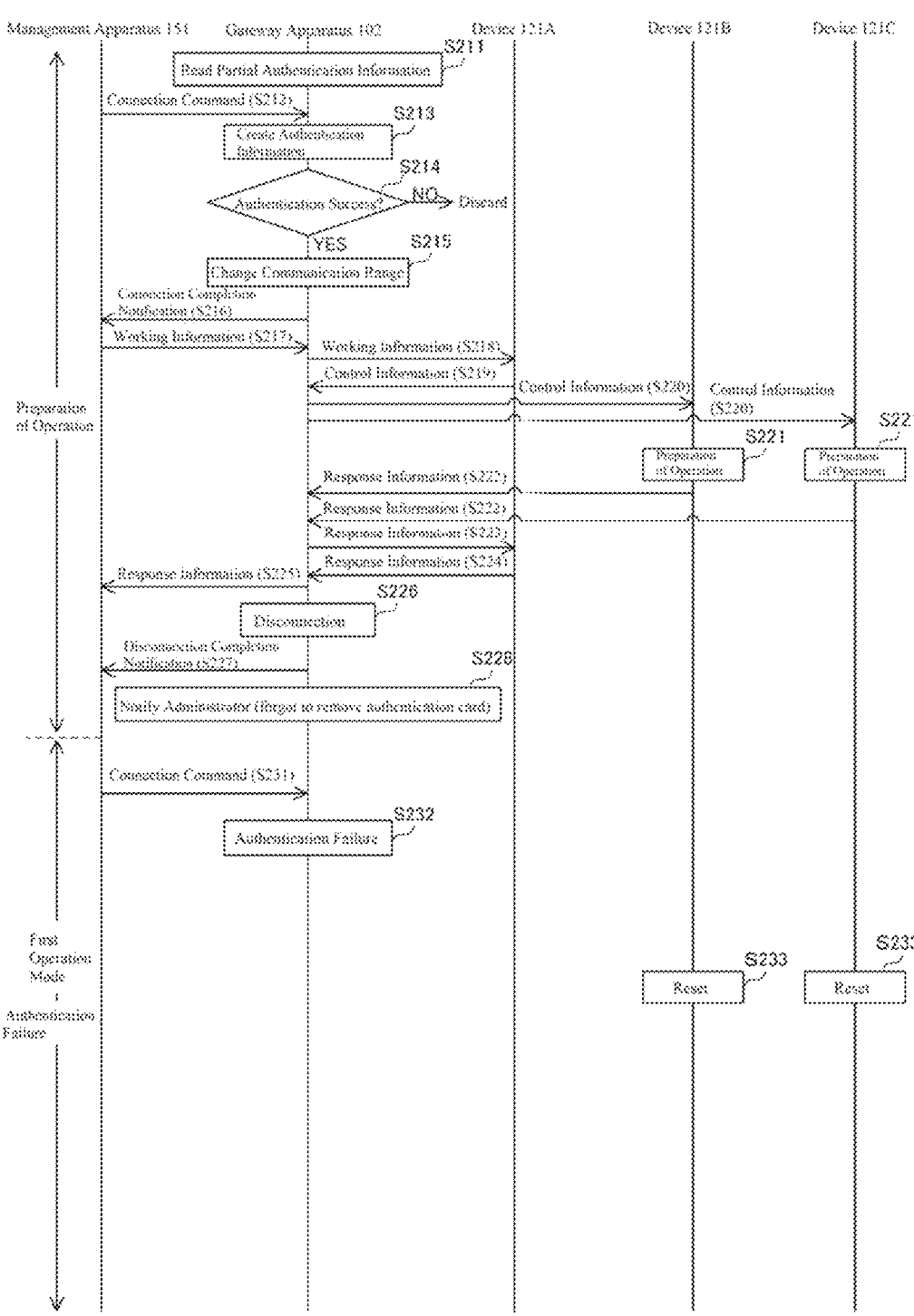
FIG. 7 is a sequence diagram defining an example of a working procedure of each apparatus in a communication system according to a second embodiment of the present disclosure.

FIG. 7 is a sequence diagram defining an example of a working procedure of each apparatus in the communication system according to the second embodiment of the present disclosure. FIG. 7 shows an example of a working procedure of each apparatus in the case where authentication of the connection command for instructing the first operation mode among a plurality of connection commands transmitted from management apparatus 151 fails.

Referring to FIG. 7, the operation from Step S211 to Step S227 is the same as the operation from Step S111 to Step S127 shown in FIG. 6, and thus the detailed description thereof will not be repeated here.

Next, gateway apparatus 102 notifies the administrator that the disconnection completion notification has been transmitted to management apparatus 151, for example, by displaying the notification on the monitor or the like (not shown). However, it is assumed that the administrator forgets to remove the authentication card from gateway apparatus 102 (Step S228).

Next, when instructing device 121B to perform the start of operation as the first operation mode, management apparatus 151 transmits the connection command including the status information indicating the device ID of device 121B and the second partial authentication information to gateway apparatus 102 (Step S231).

Next, when gateway apparatus 102 receives the connection command from management apparatus 151, gateway apparatus 102 attempts to create the authentication information using the second partial authentication information included in the connection command, but cannot create the authentication information because the first partial authentication information has not been read from the authentication card. Therefore, gateway apparatus 102 determines that the authentication of the connection command is failed (Step S232).

Next, devices 121B and 121C, for which the preparation for operation has been completed, do not receive the working information indicating the start of operation even after a predetermined time has elapsed, and thus reset the preparation for operation (Step S233).

Gateway apparatus 102 is not limited to a configuration in which gateway apparatus 102 instructs each of devices 121 to perform the end of operation when the authentication of the connection command fails. For example, gateway apparatus 102 may be configured to maintain the operation state of each of devices 121 even when the authentication of the connection command fails.

Further, gateway apparatus 102 may be configured to instruct each of devices 121 to perform the end of operation when the authentication of the connection command fails, and to change communication range CR so that gateway apparatus 102 can communicate with the monitoring apparatus that detects unauthorized access and the like. in communication system 202.

The other configuration and operation are the same as those of communication system 201 according to the first embodiment, and thus the detailed description thereof will not be repeated here.

[Modification 1]

Authentication unit 21 may be configured to perform authentication of the connection command from management apparatus 151 further on the basis of an acquisition order of the divided pieces of the authentication information.

In this case, for example, only when authentication unit 21 acquires the first partial authentication information registered in the authentication card and then acquires the second partial authentication information included in the connection command from management apparatus 151, authentication unit 21 determines that the authentication on the basis of these pieces of partial authentication information is successful.

That is, when the administrator inserts the authentication card into gateway apparatus 102 after management apparatus 151 transmits the connection command to gateway apparatus 102, it is determined that the authentication by authentication unit 21 is failed.

[Modification 2]

Authentication unit 21 may be configured to perform authentication of a connection command from management apparatus 151 further on the basis of an acquisition interval of the divided pieces of the authentication information.

In this case, for example, authentication unit 21 determines that the authentication on the basis of partial authentication information is successful only when the time between an acquisition timing of the first partial authentication information and an acquisition timing of the second partial authentication information is within the predetermined time.

[Modification 3]

Authentication unit 21 may be configured to perform authentication of the connection command from management apparatus 151 further on the basis of both an acquisition order and an acquisition interval of the divided pieces of the authentication information.

In this case, for example, authentication unit 21 determines that authentication on the basis of partial authentication information is successful only when the second partial authentication information is acquired after the first partial authentication information is acquired and the time from an acquisition timing of the first partial authentication information to an acquisition timing of the second partial authentication information is within the predetermined time.

The above embodiments should be considered as illustrative and not restrictive in all respects. The scope of the present invention is defined by the appended claims rather than the foregoing description, and is intended to include all modifications within the scope and meaning equivalent to the appended claims.

Each of the process (each of the functions) of the above-described embodiments is achieved by a processing circuit including one or more processors. The processing circuit may be configured by an integrated circuit or the like in which one or more memories, various analog circuits, and various digital circuits are combined in addition to the one or more processors. The one or more memories store a program (instructions) for causing the one or more processors to execute each of the processes. The one or more processors may execute each of the processes in accordance with the program read from the one or more memories, or may execute each of the processes in accordance with logic circuit designed in advance to execute each of the processes. The processor may be any of various processors suitable for control of a computer, such as a central processing unit (CPU), a graphics processing unit (GPU), a digital signal processor (DSP), a field programmable gate array (FPGA), and an application specific integrated circuit (ASIC). The plurality of processors physically separated from each other may execute each of the processes in cooperation with each other. For example, the processors mounted on the plurality of physically separated computers may execute each of the processes in cooperation with each other via a network such as a local area network (LAN), a wide area network (WAN), or the Internet. The program may be installed in the memory from an external server device or the like via the network, or may be distributed in a state of being stored in recording media such as a compact disc read only memory (CD-ROM), a digital versatile disk read only memory (DVD-ROM), and a semiconductor memory and installed in the memory from the recording media.

The above description includes the features appended below.

APPENDIX 1

A communication system including:
a management apparatus; and
a security apparatus including a plurality of communication ports configured to be capable of connecting devices, and a switching unit configured to be capable of communicating with the plurality of devices via the plurality of respective communication ports, in which
the management apparatus is configured to transmit, to the security apparatus, a connection command to be given to at least any one device among the plurality of devices, the connection command including authentication information,
the security apparatus is configured to perform, on the basis of the authentication information included in the connection command received from the management apparatus, authentication of the connection command, the security apparatus is configured to, when the authentication is successful, set a communication range of the at least any one device via the switching unit in accordance with the connection command, the communication range being formed by the switching unit,
the management apparatus is configured to determine an operation detail to be given to each of the devices as an instruction, in accordance with operation states of one or more of the devices, and to transmit the connection command corresponding to the determined operation detail to the security apparatus, and
the security apparatus is configured to, at a normal time, disable communication with all of the devices via the switching unit, and to enable communication with some or all of each of the devices in accordance with the connection command.

APPENDIX 2

A security apparatus including:
a plurality of communication ports configured to be capable of connecting devices;
a switching unit configured to be capable of communicating with the plurality of devices via the plurality of respective communication ports; and
a processing circuit, in which
the processing circuit is configured to
obtain a connection command to be given to at least any one device among the plurality of devices, the connection command including authentication information, perform authentication of the connection command on the basis of the authentication information, and when the authentication is successful, set a communication range of the at least any one device via the switching unit in accordance with the connection command, the communication range being formed by the switching unit.

REFERENCE SIGNS LIST

11, 21 authentication unit
12 storage unit
13 switching unit
15 input reception unit
101, 102 gateway apparatus (security apparatus)
121, 121A, 121B, 121C device
151 management apparatus
201, 202 communication system
P, PA, PB, PC communication port

The invention claimed is:
1. A security apparatus comprising:
a plurality of communication ports configured to connect a plurality of circuitries;
a switching circuit configured to communicate with the plurality of circuitries via the plurality of respective communication ports; and
an authentication circuit configured to
acquire a connection command to be given to at least any one circuitry among the plurality of circuitries, the connection command including authentication information,
perform authentication of the connection command on the basis of the authentication information, and
when the authentication is successful, set a communication range of the at least any one circuitry via the switching circuit in accordance with the connection command, the communication range being formed by the switching circuit.

2. The security apparatus according to claim 1, wherein the connection command includes status information indicating the communication range.

3. The security apparatus according to claim 1, wherein the connection command includes timing information indicating a timing of changing the communication range.

4. The security apparatus according to claim 1, wherein the authentication circuit is configured to acquire divided pieces of the authentication information.

5. The security apparatus according to claim 4, wherein the authentication circuit is configured to perform the authentication further on the basis of at least any one of an acquisition order and an acquisition interval of the divided pieces of the authentication information.

6. The security apparatus according to claim 1, wherein
the security apparatus comprises three or more communication ports,
the plurality of circuitries includes three or more circuitries, and
the authentication circuit is configured to disable communication by some of the three or more circuitries via the switching circuit in accordance with the connection command when the authentication is successful.

7. A management apparatus in a communication system including a security apparatus capable of communicating with a plurality of circuitries and capable of setting a communication range of each of the circuitries via the security apparatus, the management apparatus comprising:
processing circuitry configured to
transmit, to the security apparatus, a connection command to be given to at least any one circuitry among the plurality of circuitries, the connection command including authentication information, and
transmit working information, after authentication of the connection command is successful, via the security apparatus to at least any one circuitry of the plurality of circuitries within the communication range, the working information defining operation of the at least any one circuitry with respect to the plurality of circuitries.

8. A communication system comprising:
a management apparatus; and
a security apparatus including a plurality of communication ports configured to connect a plurality of circuitries and a switching circuit configured to communicate with the plurality of circuitries via the plurality of respective communication ports, wherein
the management apparatus includes processing circuitry configured to transmit, to the security apparatus, a connection command to be given to at least any one circuitry among the plurality of circuitries, the connection command including authentication information, and
the security apparatus includes processing circuitry configured to
perform, on the basis of the authentication information included in the connection command received from the management apparatus, authentication of the connection command, and
when the authentication is successful, set a communication range of the at least any one circuitry via the switching circuit in accordance with the connection command, the communication range being formed by the switching circuit.

9. A security management method in a security apparatus including a plurality of communication ports configured to connect a plurality of circuitries and a switching circuit configured to communicate with the plurality of circuitries via the plurality of respective communication ports, the security management method comprising:
obtaining a connection command to be given to at least any one circuitry among the plurality of circuitries, the connection command including authentication information,
performing authentication of the connection command on the basis of the obtained authentication information, and
when the authentication is successful, setting a communication range of the at least any one circuitry via the switching circuit in accordance with the connection command, the communication range being formed by the switching circuit.

10. The security apparatus according to claim 2, wherein the connection command includes timing information indicating a timing of changing the communication range.

11. The security apparatus according to claim 2, wherein the authentication circuit is configured to acquire divided pieces of the authentication information.

12. The security apparatus according to claim 3, wherein the authentication circuit is configured to acquire divided pieces of the authentication information.

13. The security apparatus according to claim 2, wherein
the security apparatus comprises three or more communication ports,
the plurality of circuitries includes three or more circuitries, and
the authentication circuit is configured to disable communication by some of the three or more circuitries via the switching circuit in accordance with the connection command when the authentication is successful.

14. The security apparatus according to claim 3, wherein
the security apparatus comprises three or more communication ports,
the plurality of circuitries includes three or more circuitries, and
the authentication circuit is configured to disable communication by some of the three or more circuitries via the switching circuit in accordance with the connection command when the authentication is successful.

15. The security apparatus according to claim 4, wherein
the security apparatus comprises three or more communication ports,
the plurality of circuitries includes three or more circuitries, and
the authentication circuit is configured to disable communication by some of the three or more circuitries via the switching circuit in accordance with the connection command when the authentication is successful.

16. The security apparatus according to claim 5, wherein
the security apparatus comprises three or more communication ports,
the plurality of circuitries includes three or more circuitries, and
the authentication circuit is configured to disable communication by some of the three or more circuitries via the switching circuit in accordance with the connection command when the authentication is successful.

17. The security apparatus according to claim 1, wherein the communication range includes a set of allowed communication paths or connections between the circuitries.

18. The security apparatus according to claim 1, wherein the authentication circuit is configured to perform the authentication of the connection command by comparing the authentication information included therein with stored determination criteria.

19. The security apparatus according to claim 1, wherein the switching circuit is further configured to transmit working information after the authentication is successful via the switching circuit to the at least any one circuitry within the set communication range, the working information defining operation of the at least any one circuitry with respect to the plurality of circuitries.

20. The security apparatus according to claim 1, wherein communication paths via the switching circuit are disconnected when no command has been successfully authenticated.

\* \* \* \* \*